(12) United States Patent
Wang et al.

(10) Patent No.: US 9,328,301 B2
(45) Date of Patent: May 3, 2016

(54) INJECTOR AND METHOD FOR CO-FEEDING SOLID AND LIQUID FUELS

(75) Inventors: Xiangqi Wang, Shanghai (CN); Wei Chen, Shanghai (CN); Ke Liu, Rancho Santa Margari, CA (US); Lishun Hu, Shanghai (CN); Zhe Cui, Fountain Valley, CA (US); Xianglong Zhao, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 123 days.

(21) Appl. No.: 13/513,435

(22) PCT Filed: Nov. 9, 2010

(86) PCT No.: PCT/US2010/055976
§ 371 (c)(1),
(2), (4) Date: Jan. 7, 2013

(87) PCT Pub. No.: WO2011/068641
PCT Pub. Date: Jun. 9, 2011

(65) Prior Publication Data
US 2013/0134232 A1     May 30, 2013

(30) Foreign Application Priority Data

Dec. 3, 2009 (CN) .......................... 2009 1 0250066

(51) Int. Cl.
*C10J 3/50* (2006.01)
*C01B 3/36* (2006.01)
(Continued)

(52) U.S. Cl.
CPC . *C10J 3/50* (2013.01); *C01B 3/363* (2013.01); *C10J 3/506* (2013.01); *F23D 17/007* (2013.01);
(Continued)

(58) Field of Classification Search
CPC ... F23D 17/007; F23D 2204/30; F23D 1/005; F23C 1/10; C10J 3/506; C10J 2200/152; C01B 3/363
USPC .......................................................... 110/262
See application file for complete search history.

(56) References Cited

U.S. PATENT DOCUMENTS 2,366,463 A * 1/1945 Vroom et al. ................. 110/262
3,929,429 A * 12/1975 Crouch ................... C01B 3/363
                                                  252/373

(Continued)

FOREIGN PATENT DOCUMENTS

CN          86102626 A     12/1986
EP           0108427 A1     5/1984

(Continued)

OTHER PUBLICATIONS

International Search Report dated Jul. 15, 2011 which was issued in connection with PCT Application No. PCT/US10/55976 which was filed on Nov. 9, 2010.

(Continued)

*Primary Examiner* — David J Laux
(74) *Attorney, Agent, or Firm* — GE Global Patent Operation; Peter T. DiMauro

(57) ABSTRACT

An injector for co-feeding liquid and solid fuels into a gasifier is provided. The injector includes a body, a first member, and a second member. The body comprises a first channel for conveying a liquid fuel. The first member surrounds the body to define a second channel for pneumatically conveying a solid fuel. The second member surrounds the first member to define a third channel for conveying a fluid stream for dispersing the solid fuel. The liquid fuel is atomized before being mixed with the solid fuel. A method for co-feeding liquid and solid fuels is also presented.

21 Claims, 5 Drawing Sheets

(51) Int. Cl.
*F23D 17/00* (2006.01)
*F23D 1/00* (2006.01)

(52) U.S. Cl.
CPC ...... *C10J 2200/152* (2013.01); *C10J 2300/093* (2013.01); *C10J 2300/094* (2013.01); *C10J 2300/0916* (2013.01); *C10J 2300/0946* (2013.01); *C10J 2300/0956* (2013.01); *C10J 2300/0959* (2013.01); *C10J 2300/0969* (2013.01); *C10J 2300/0976* (2013.01); *C10J 2300/1807* (2013.01); *F23D 1/005* (2013.01); *F23D 2204/30* (2013.01); *Y02E 20/18* (2013.01)

(56) References Cited

U.S. PATENT DOCUMENTS

| | | | | |
|---|---|---|---|---|
| 3,971,639 | A * | 7/1976 | Matthews | 48/202 |
| 4,208,180 | A * | 6/1980 | Nakayasu et al. | 431/284 |
| 4,333,405 | A * | 6/1982 | Michelfelder et al. | 110/264 |
| 4,428,309 | A * | 1/1984 | Chang | 110/262 |
| 4,474,120 | A * | 10/1984 | Adrian et al. | 110/261 |
| 4,493,271 | A * | 1/1985 | Ohayon et al. | 110/262 |
| 4,679,512 | A * | 7/1987 | Skoog | 110/347 |
| 4,748,919 | A * | 6/1988 | Campobenedetto et al. | 110/264 |
| 5,203,692 | A * | 4/1993 | Wexoe | 431/284 |
| 5,231,937 | A * | 8/1993 | Kobayashi et al. | 110/262 |
| 5,484,107 | A * | 1/1996 | Holmes | 239/427.5 |
| 5,513,583 | A * | 5/1996 | Battista | 110/261 |
| 5,651,320 | A * | 7/1997 | Leisse et al. | 110/262 |
| 5,806,443 | A * | 9/1998 | Kobayashi et al. | 110/262 |
| 5,941,459 | A * | 8/1999 | Brooker et al. | 239/397.5 |
| 5,988,081 | A * | 11/1999 | Ashworth | F23C 3/008 110/233 |
| 6,116,171 | A * | 9/2000 | Oota et al. | 110/263 |
| 6,152,051 | A * | 11/2000 | Kiyama et al. | 110/262 |
| 6,196,142 | B1 * | 3/2001 | Ohlsen | 110/264 |
| 6,330,789 | B2 * | 12/2001 | Onoda et al. | 60/773 |
| 6,389,998 | B2 * | 5/2002 | Mukai et al. | 110/347 |
| 7,506,822 | B2 | 3/2009 | Cairo et al. | |
| 8,177,145 | B2 | 5/2012 | Bhaisora et al. | |
| 2007/0277528 | A1 | 12/2007 | Homitz et al. | |
| 2009/0272822 | A1 | 11/2009 | Davis et al. | |
| 2010/0058961 | A1 * | 3/2010 | Fujimori et al. | 110/261 |
| 2011/0076116 | A1 * | 3/2011 | Liu et al. | 414/160 |

FOREIGN PATENT DOCUMENTS

| | | |
|---|---|---|
| EP | 0205238 A2 | 12/1986 |
| EP | 2113717 A2 | 11/2009 |
| WO | 9901525 | 1/1999 |
| WO | 2009134530 A2 | 11/2009 |

OTHER PUBLICATIONS

CN Office Action dated Jul. 26, 2013 from corresponding CN Application No. 200910250066.5.

* cited by examiner

INJECTOR AND METHOD FOR CO-FEEDING SOLID AND LIQUID FUELS

CROSS REFERENCE TO RELATED APPLICATIONS

This is a national stage application under 35 U.S.C. §371 (c) of prior-filed, co-pending PCT patent application serial number PCT/US2010/055976, filed on Nov. 9, 2010, which claims priority to Chinese Patent Application No. 200910250066.5, filed on Dec. 3, 2009, the entire contents of which are incorporated herein by reference.

BACKGROUND OF THE INVENTION

1. Field of the Invention

Embodiments of the present invention generally relate to a gasification system, and more particularly to an injector and a method for co-feeding solid and liquid fuels into a gasifier of the gasification system.

2. Description of the Prior Art

Gasifiers are generally used to convert a mixture of fuel and an oxidizing stream into hydrogen and CO, generally referred to as "syngas." The syngas has many industrial applications. For example, the syngas is used to produce electricity in an IGCC (Integrated Gasification Combine Cycle) plant, or to produce chemicals in a chemical plant. Gasifiers are generally divided into two types, depending upon the form of the feedstock (fuel): dry feed gasifiers and liquid feed gasifiers. Both of the dry feed gasifiers and the liquid feed gasifiers have advantages and disadvantages. In recent years, however, the dry feed gasifiers development has had attraction for their wide fuel flexibility and higher efficiency.

In gasification systems, injectors are employed to inject feedstock into gasifiers. A conventional injector for feeding a gasifier generally has two channels: a first channel and a second channel. The first channel is used to pneumatically convey a solid fuel such as a pulverized coal or a liquid fuel such as a coal slurry, and the second channel is used to convey an oxidizing stream for dispersing the solid fuel or the liquid fuel into the gasifier.

During gasification process, fly ash (fine particles) containing unconverted coal is generated along with the syngas. The fine particles in the syngas will be captured in a syngas water-scrubbing unit. For utilizing the unconverted carbon contained in the fine particles, it is desired to recycle the fine particles back to the gasifier. However, the fine particles are generally mixed with wastewater from the syngas water-scrubbing unit to form a stream (referred to as "recycled fines slurry" thereafter) that is difficult to be directly mixed with solid fuel such as pulverized coal.

Therefore, if using the conventional injector for feeding the solid fuel, mixing between the recycled fines slurry and the solid fuel is difficult. Furthermore, it leads to reduced flowability of the solid fuel and decreased uniformity of fuel concentration in the gasifier, resulting in less efficient gasification performance. There is a need for an improved injector for co-feeding recycled fines slurry and solid fuel to improve gasification performance.

BRIEF SUMMARY OF THE INVENTION

In accordance with one embodiment of the present invention, an injector comprises a body, a first member, and a second member. The body comprises a first channel for conveying a liquid fuel. The first member surrounds the body to define a second channel for pneumatically conveying a solid fuel. The second member surrounds the first member to define a third channel for conveying a fluid stream for dispersing the solid fuel. The liquid fuel is atomized before being mixed with the solid fuel.

In accordance with another embodiment of the present invention, an injector comprises a body, a first member, and a second member. The body comprises a first channel for conveying a recycled fines slurry. The first member surrounds the body to define a second channel for pneumatically conveying a solid fuel. The second member surrounds the first member to define a third channel for conveying a fluid stream for dispersing the solid fuel. The recycled fines slurry is atomized before being mixed with the solid fuel.

In accordance with another embodiment of the present invention, a feeding method is provided. The method comprises: conveying a liquid fuel through a first channel; conveying a solid fuel through a second channel surrounding the first channel; conveying a fluid stream though a third channel surrounding the second channel; and atomizing the liquid fuel into an atomized liquid fuel before being mixed with the solid fuel.

These and other advantages and features will be further understood from the following detailed description of preferred embodiments of the present invention that is provided in connection with the accompanying drawings.

DETAILED DESCRIPTION OF THE INVENTION

Embodiments of the present disclosure will be described hereinbelow with reference to the accompanying drawings. In the following description, well-known functions or constructions are not described in detail to avoid obscuring the disclosure in unnecessary detail.

Figure 1:
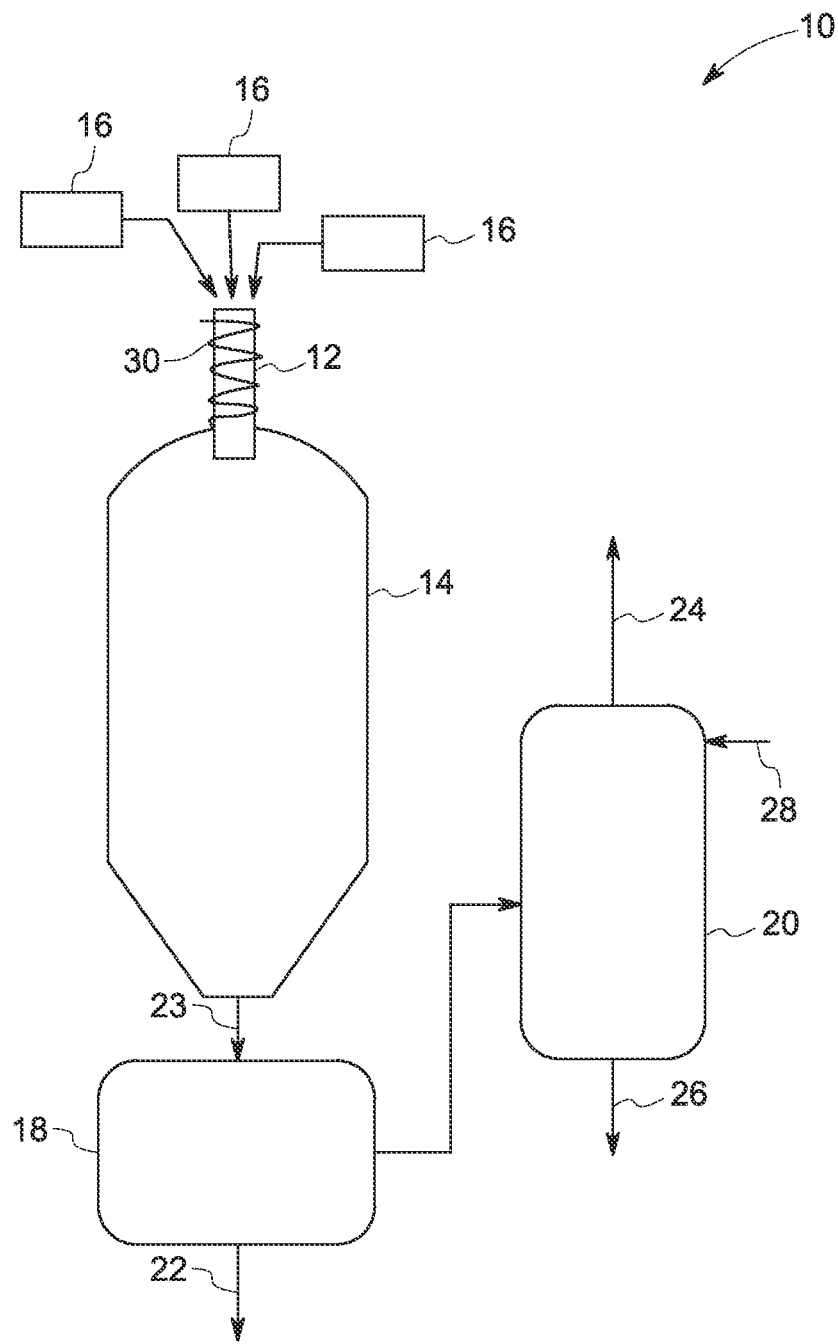
FIG. 1 is a schematic diagram of a gasification system using an injector in accordance with one embodiment of the present invention.

Injectors and methods in accordance with the present invention are applied to various gasification systems in IGCC power generation systems or other polygeneration applications such as coal to chemicals. FIG. 1 illustrates a gasification system 10 including an injector 12 in accordance with one embodiment of the present invention. The gasification system 10 further includes a gasifier 14, two or more sources 16, a cooler 18, and a scrubbing tower 20.

The two or more sources 16 provide various fuels including liquid and solid fuels or oxidizing stream that are injected into the gasifier 14 by the injector 12. The fuels and oxidizing stream are reacted in the gasifier 14 to produce a raw syngas 23 at high temperature. The raw syngas 23 is then discharged to the cooler 18 for lowering the temperature. In the cooling process, large solid particles contained in the raw syngas 23 become coarse slag 22 and then are discharged from the cooler 18.

In order to achieve a purified syngas 24, the hot raw syngas 23 generated in the gasifier 14 and cooled in cooler 18 is sent into the scrubbing tower 20 for purification. Water 28 is supplied to the scrubbing tower 20 to scrub the raw syngas 23. The water 28 captures fly ash fine particles mixed in the raw syngas 23 to form a recycled fines slurry 26 that is then discharged from the scrubbing tower 20.

The injector 12 is configured to enable the liquid fuel to mix with the solid fuel. The recycled fines slurry 26 as one kind of liquid fuel can be recycled using the injector 12, thereby improving overall energy efficiency. Detail configurations of the injector 12 and other embodiments of the present invention will be discussed below.

Figure 2:
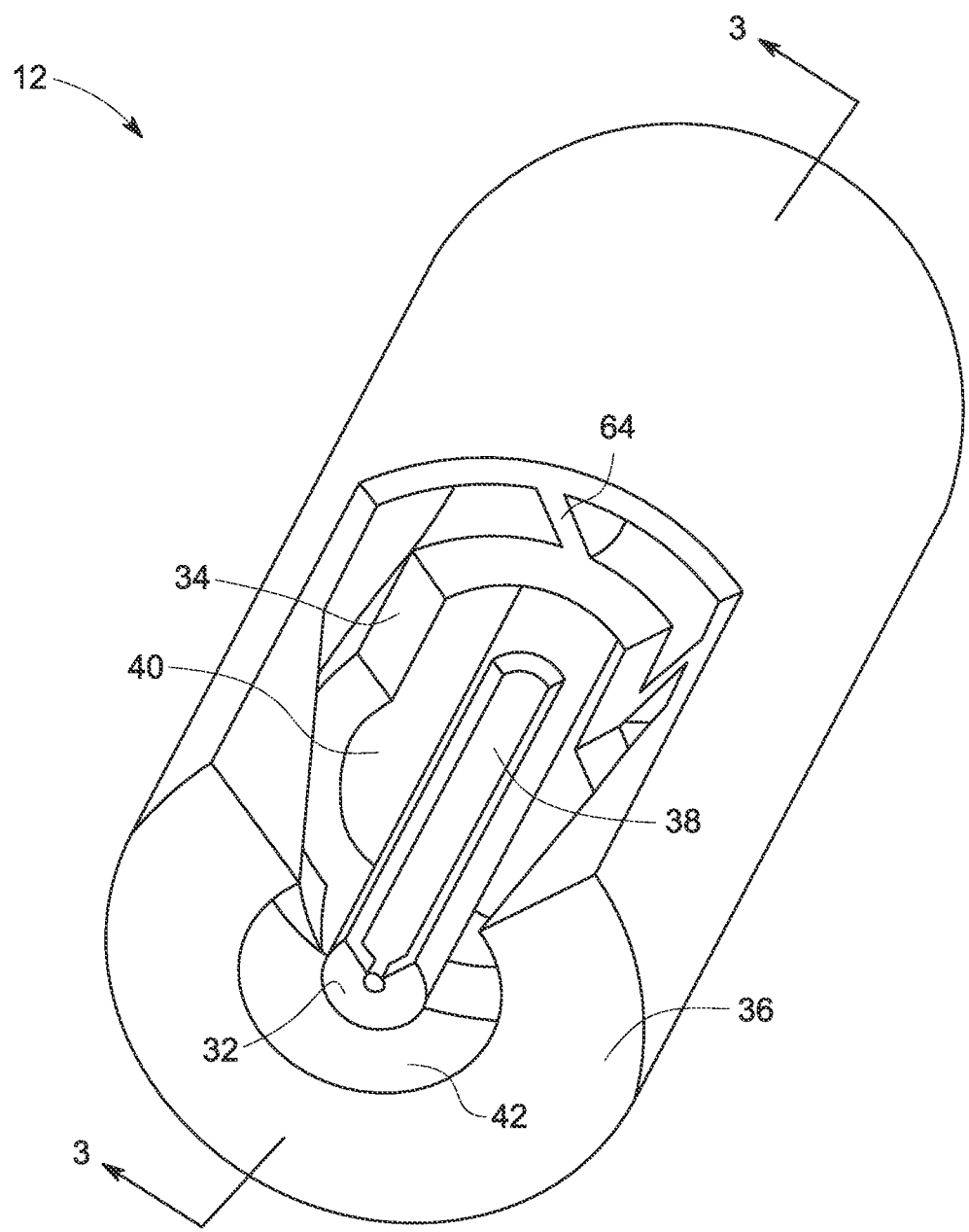
FIG. 2 is a schematic perspective view of an injector from FIG. 1 in accordance with one embodiment of the present invention, partially cutting out an end portion.

Referring to FIG. 2, the injector 12 includes a central body 32 having a first channel 38, a first member 34, and a second member 36 serving as an outer casing of the injector 12.

Figure 3:
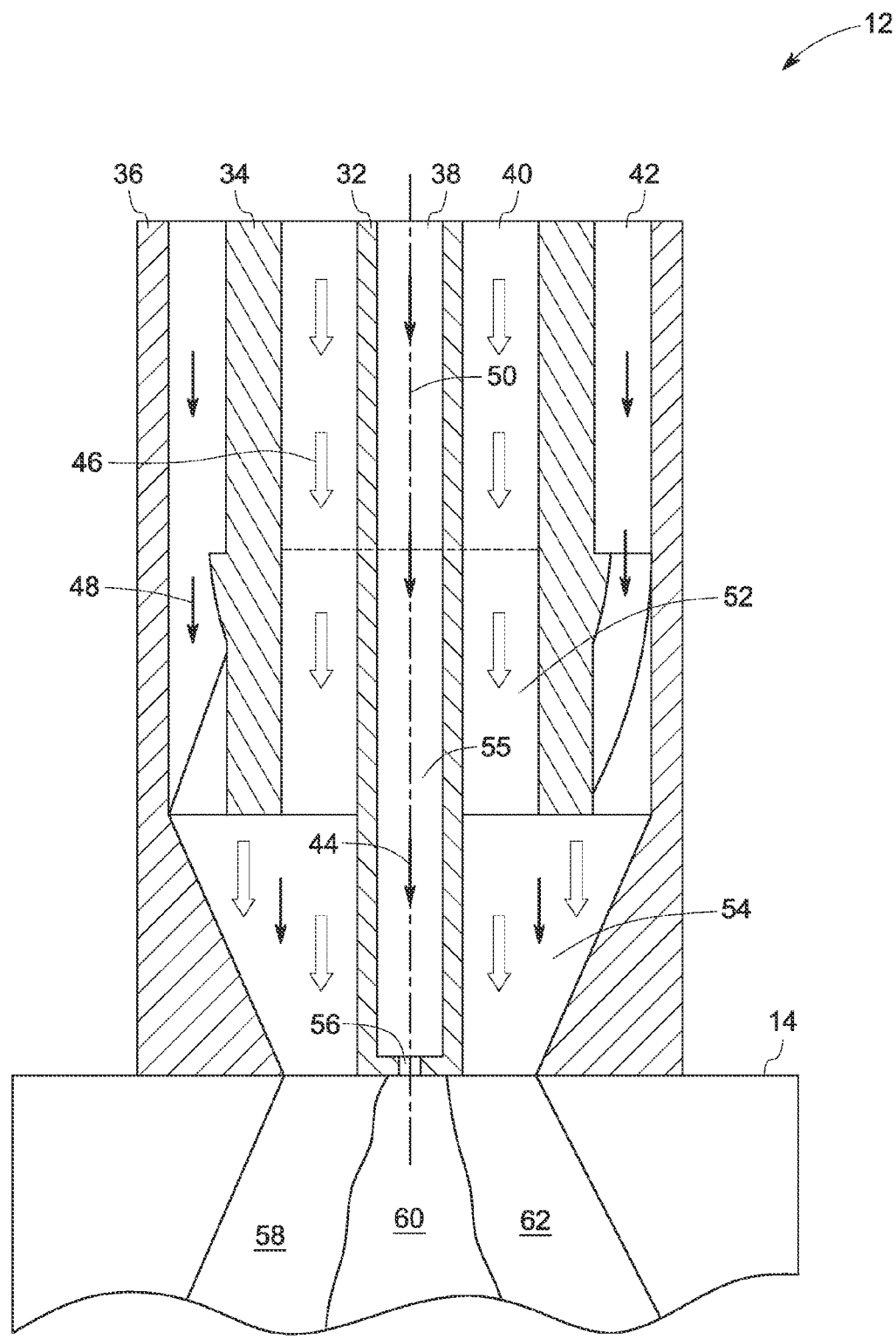
FIG. 3 is a sectional view of the injector taken along the line 3-3 of FIG. 2.

Referring to FIGS. 2 and 3, the first channel 38 extends through upper and lower surfaces of central body 32 for conveying a liquid fuel 44. The first channel 38 is generally aligned along the same longitudinal axis 50 of the injector 12. The first member 34 is concentric with the central body 32 to define a second channel 40 for pneumatically conveying a solid fuel 46. The second member 36 is concentric with the first member 34 to define a third channel 42 for conveying a fluid stream 48. In one embodiment, the central body 32, the first member 34 and the second member 36 each have an annular cross section. However, the scope of the present invention is not limited to this kind of shape since the shapes of various parts of the injector 12 may change according to the practical requirements or design selections.

The first channel 38 includes an upper section 55 and a bottom section 56, as best shown in FIG. 3. In one embodiment, the bottom section 56 has a smaller diameter than the upper section 55, to achieve a high vaporization rate of the liquid fuel 44. The second channel 40 has a discharge end 52 surrounding the first channel 38. The injector 12 has a discharge end 54 where the fluid stream 48 is mixed with the solid fuel 46. The discharge end 54 is located below the discharge end 52 and converges inwardly to accelerate the flow rate of the mixture of the solid fuel 46 and the fluid stream 48.

The first channel 38 extends toward the discharge end 54 and produces enough pressure difference such that the conveyed liquid fuel 44 is atomized before being mixed with the solid fuel 46. In some embodiments, the dimension of the first channel 38 varies with many factors such as diameter of the first channel 38 and the composition of the liquid fuel 44. In one embodiment, the first channel 38 extends into the discharge end 54 and is aligned with a bottom surface of the discharge end 54. With this kind of configuration, the liquid fuel 44 and the solid fuel 46 are conveyed separately, thereby avoiding negative effect possibly incurred between them.

In some applications, the first channel 38 terminates in the discharge end 54 as long as the length of first channel 38 is long enough for atomizing the liquid fuel 44. The atomized liquid fuel (not labeled) is well mixed with the solid fuel 46 in the discharge end 54 avoiding negative effect on the flowability of the solid fuel 46. The efficient flowability improves the uniformity of fuels concentration in the gasifier 14 and leads to improved gasification performance.

FIG. 3 schematically shows a connection between the injector 12 and the gasifier 14 (see FIG. 1). The fuels sprayed in the gasifier 14 are roughly separated into three sections 58, 60 and 62. Using conventional injectors feeding dry fuel (solid fuel), a hollow cone phenomenon is observed, which means the concentration of the solid fuel in section 60 is lower than that in sections 58 and 62. Uniformity of fuel concentration could affect the carbon conversion in gasifier 14. Carbon conversion, the percentage of carbon contained in the fuels converted into syngas during gasification, is one of the parameters used to measure the gasification performance. In one embodiment, the first channel 38 is disposed at the right center of the injector 12 such that the atomized liquid fuel from the first channel 38 is mostly dispersed in the section 60, which efficiently improves the uniformity of the fuel concentration in the gasifier 14. The carbon conversion as well as the overall gasification efficiency is enhanced accordingly.

As discussed briefly above, in some embodiments, the liquid fuel 44 is the recycled fines slurry 26 (see FIG. 1). The recycled fines slurry 26 has unreacted carbon that will react once reintroduced into the gasifier, improving the overall energy efficiency of the gasifier. In some embodiments, the liquid fuel 44 (FIG. 3) consists of the recycled fines slurry 26 and additives. The additives are used for adjusting the fusion point of the fine slag of the recycled fines slurry 26 to provide a reasonable range of solid fuel choices and ultimately, fuel flexibility. In another embodiment, the liquid fuel 44 further includes a moderator such as a water stream to control the temperature of the injector 12. In still another embodiment, the liquid fuel 44 is coal slurry or a combination of the coal slurry, additives and the moderator. The additives are used for adjusting the fusion point of the coal to expand the range of coal choices.

In some embodiments, carbon dioxide, inert gases, nitrogen or other suitable gases are used for carrying the solid fuel 46 during conveyance. In another embodiment, the solid fuel 46 is pulverized coal, pulverized biomass, petroleum coke, oil shale, oil sand, municipal waste or any combinations of them.

In one embodiment, the fluid stream 48 is an oxidizing stream that could be oxygen, air, carbon dioxide, steam or any combinations of them.

Referring to FIGS. 2 and 3, in one embodiment, for further mixing solid fuel 46 and the fluid stream 48, the third channel 42 arranges a plurality of swirl vanes 64 to impart swirling flow to the fluid stream 48. In one embodiment, the swirl vanes 64 extend from an outer surface of the first member 34 around the discharge end 52 and terminate at an inner surface of the second member 36. In some embodiments, the swirl vanes 64 are only attached to the inner surface of the second member 36. In another embodiment, the swirl vanes 64 are only attached to the outer surface of the first member 34. In still another embodiment, a portion of the swirl vanes 64 are attached to the outer surface of the first member 34; and the other portion of the swirl vanes 64 are attached to the inner surface of the second member 36. Additionally, the swirl vanes 64 are held in place by any means that allow the fluid stream 48 to be swirled.

Although swirling flows are believed to be beneficial for mixing purposes, in some embodiments, swirl vanes 64 or other swirling mechanism are not employed if the momentum of the fluid stream 48 is sufficient for mixing.

Figure 4:
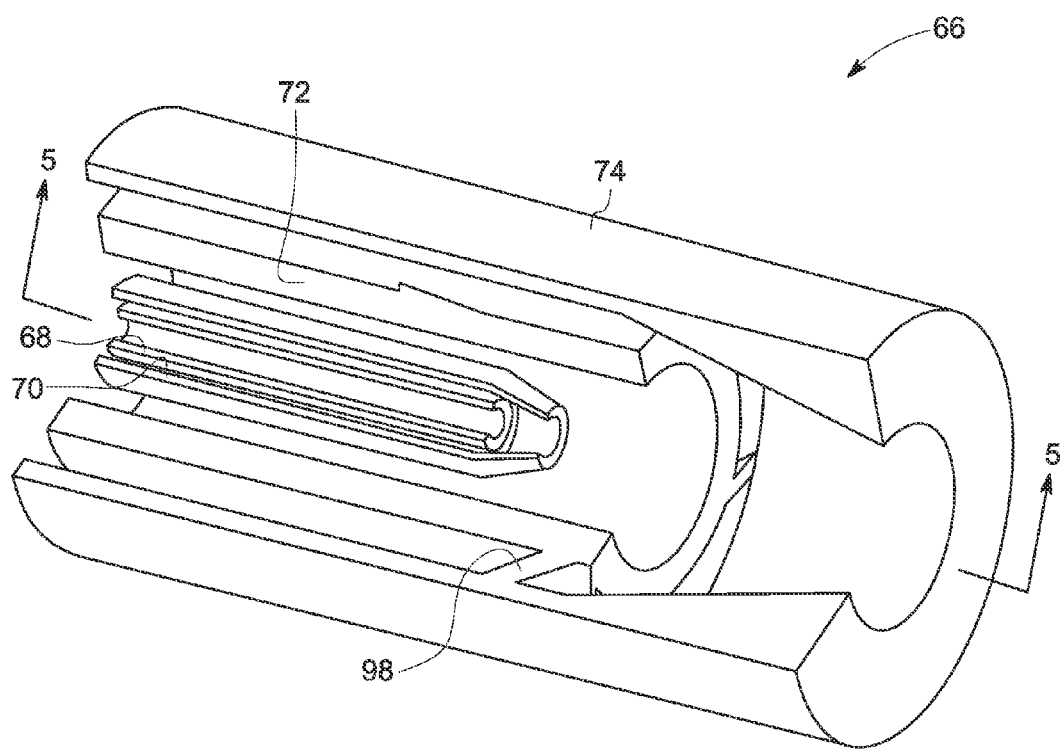
FIG. 4 is a schematic perspective view of an injector in accordance with another embodiment of the present invention, partially cutting out a side portion.
Figure 5:
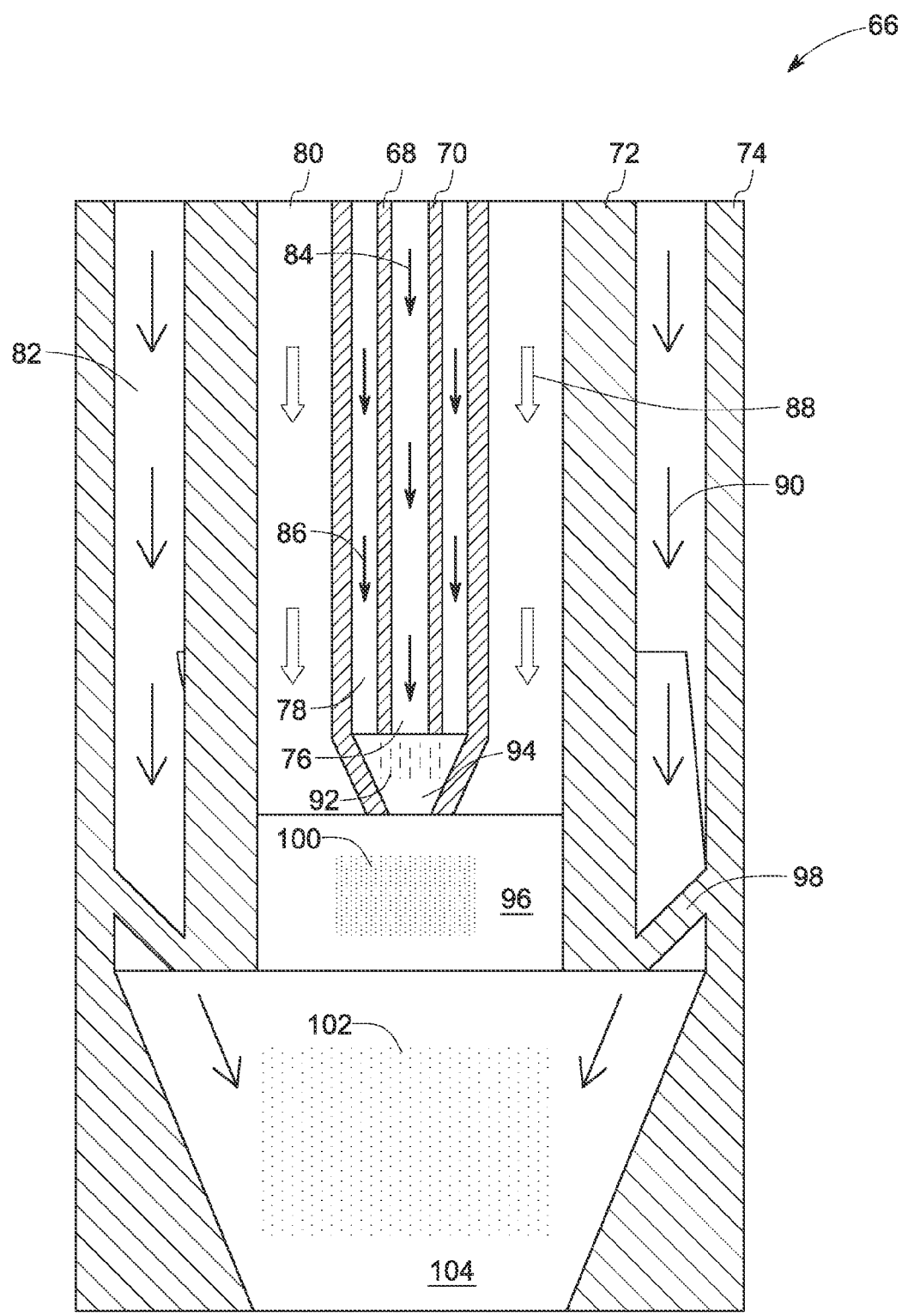
FIG. 5 is a sectional view of the injector taken along line 5-5 of FIG. 4.

As illustrated in FIG. 4 and FIG. 5, an injector 66 in accordance with another embodiment of the present invention is provided. The injector 66 includes a central body 68, a first member 70, a second member 72, a third member 74 and first, second and third discharge ends 94, 96 and 104 (see FIG. 5). Referring to FIGS. 4 and 5, the central body 68 has a first channel 76 extending through upper and lower surfaces thereof and is configured for conveying a liquid fuel 84. The first channel 76 is placed at the right center of the injector 66. The first member 70 is concentric with the central body 68 to define a second channel 78 for conveying an atomization gas 86. In some embodiments, the atomization gas 86 is an oxidizing stream that could be oxygen, air, carbon dioxide, steam or any combinations of them. The atomization gas 86 is provided here for atomizing the liquid fuel 84.

The second member 72 is concentric with the first member 70 to define a third channel 80 for pneumatically conveying a solid fuel 88. In some embodiments, carbon dioxide, inert gases, nitrogen or other suitable gases are used for carrying the solid fuel 88 during conveyance. In another embodiment, the solid fuel 88 is pulverized coal, pulverized biomass, petroleum coke, oil shale, oil sand, municipal waste or any combinations of them. The third member 74 is concentric with the second member 72 to define a fourth channel 82 for conveying a fluid stream 90. In some embodiments, the fluid stream 90 is another oxidizing stream that could be oxygen, air, carbon dioxide, steam or any combinations of them.

Although the central body 68, the first member 70, the second member 72, and the third member 74 each have an annular cross section, this will not limit the scope of the present invention to this kind of shape. In some embodiments, each member of the injector 66 may be configured in other shapes according to the application requirements or design selections.

Referring to FIGS. 4 and 5, the first channel 76 includes a discharge end (not labeled) that is cylindrical. The first discharge end 94 is cone-shaped, which is formed by the first member 70 converging inward at the end thereof. The second discharge end 96 is in cylindrical shape. The third discharge end 104 has a similar configuration with the first discharge end 96. The first, second and third discharge ends 94, 96 and 104 and the discharge end of the first channel 76 stack together along the flow direction of the liquid fuel 84.

During the operation of injecting the liquid and solid fuels 84, 88 into a gasifier (not shown), the liquid fuel 84 is conveyed through the first channel 76 and the solid fuel 88 is conveyed through the third channel 80. The atomization gas 86 conveyed through the second channel 78 atomizes the liquid fuel 84 at the first discharge end 94 to form an atomized liquid fuel 92. The atomized liquid fuel 92 is then discharged to the second discharge end 96 where the atomized liquid fuel 92 is mixed with the solid fuel 88 to form a hybrid fuel 100. Next, the hybrid fuel 100 is dispersed by the fluid stream 90 at the third discharge end 104 to form a dispersed hybrid fuel 102 that is finally injected into the gasifier.

By using the injector 66, the liquid fuel 84 is converted into the atomized liquid fuel 92 that is well mixed with the solid fuel 88, thereby improving the uniformity of the fuels concentration in the gasifier. The carbon conversation is accordingly enhanced in gasification process. As above-mentioned, the first channel is placed at the right center of the injector 66. This placement enables the uniformity of the fuels concentration in the gasifier to be further improved.

In some embodiments, the liquid fuel 84 is the recycled fines slurry 26 (see FIG. 1). The radius of the first channel 76 is configured to be in the range of one seventh to one tenth of the largest distance between the third channel 80 and the longitudinal axis (not labeled) of the injector 66 since the recycled fines slurry 26 is smaller in the amount than the solid fuel 88. Using the injector 66 to introduce the recycled fines slurry 26, overall energy efficiency of the gasifier is largely improved. In another embodiment, the liquid fuel 84 is coal slurry. In still another embodiment, the liquid fuel 84 further includes addictives and/or a moderator other than the recycled fines slurry 26 or the coal slurry.

In the embodiment in FIG. 4, the fourth channel 82 arranges a plurality of swirl vanes 98 to impart swirling flow to the fluid stream 90 in a certain flow direction. The flow direction is determined by the arrangement and/or the placement of the swirl vanes 98. The present invention will not intend to limit to any flow direction. In one embodiment, as illustrated in FIG. 5, the swirl vanes 98 are formed around the second discharge end 96 and extend from an outer surface of the second member 72 and terminate at an inner surface of the third member 74.

In some embodiments, the swirl vanes 98 are attached to the outer surface of the second member 72. In another embodiment, the swirl vanes 98 are attached to the inner surface of the third member 74. In still another embodiment, a portion of the swirl vanes 98 are attached to the outer surface of the second member 72 and the other portion of the swirl vanes 98 are attached to the inner surface of the third member 74.

In some embodiments, the second channel 78 also arranges a plurality of swirl vanes (not shown) to impart swirling flow to the atomization gas 86 so as to improve the vaporization rate. As in the above-mentioned arrangement of the swirl vanes 98, the swirl vanes are placed around the discharge end of the first channel 76 and extend from an outer surface of the central body 68 and terminate at an inner surface of the first member 70. In some embodiments, the swirl vanes are attached to the outer surface of the central body 68. In another embodiment, the swirl vanes are attached to the inner surface of the first member 70. In still another embodiment, a portion of the swirl vanes is attached to the outer surface of the central body 68 and another portion of the swirl vanes are attached to the inner surface of the first member 70.

The swirl vanes in the second channel 78 could be configured to enable the atomization gas 86 to swirl in any flow direction. In some embodiments, the flow direction of the atomization gas 86 is the same as that of the fluid stream 90. In another embodiment, the flow direction of the atomization gas 86 is perpendicular to that of the fluid stream 90.

Although swirling flows are believed to be beneficial for mixing purposes, in some embodiments, the second and fourth channels 76 and 82 are not necessarily to include the swirl vanes or other swirling mechanism if the momentum of the atomization gas 86 and the fluid stream 90 are sufficient for atomization or mixing.

A method for co-feeding liquid and solid fuels into a gasifier is provided herein in accordance with another embodiment of the present invention. The method is implemented by using an injector that can be any of the above-mentioned embodiments.

The method includes: conveying a liquid fuel 44 through a first channel 38; conveying a solid fuel 46 through a second channel 40 surrounding the first channel 38; conveying a fluid stream 48 through a third channel 42 surrounding the second channel 40; and atomizing the liquid fuel 44 before being mixed with the solid fuel 46.

In some embodiments, the first channel 38 is used to implement the step of atomizing the liquid fuel 44. The first channel 38 is configured to extend along the longitudinal axis 50 of the injector 12 and the first channel 38 produces enough pressure difference to atomize the liquid fuel 44. The atomized liquid fuel 44 is well mixed with the solid fuel 46 so that the uniformity of the fuels concentration in the gasifier 14 meets practical requirements.

In another embodiment, the first channel 38 extends beyond the second channel 40 and to be horizontally aligned with a bottom surface of an outlet of the injector. Thus, the liquid fuel 44 and the solid fuel 46 are conveyed separately avoiding negative effect incurred between them.

In still another embodiment, the method further includes conveying an atomization gas 86 through a fourth channel 82 interposed by the first channel 76 and the second channel 78. The atomization gas 86 is used to implement the step of atomizing the liquid fuel 84 to form an atomized liquid fuel 92. The method further includes mixing the atomized liquid fuel 92 with the solid fuel 88 to form a hybrid fuel 100 and dispersing the hybrid fuel 100 using the fluid stream 90. Using this method, liquid fuels 84 are converted into atomized liquid fuels 92 that can be well mixed with solid fuels 88 avoiding negative effect incurred between direct mixing, which leads to improved gasification performance.

It should be noted that "a" and "an" used to modify uncountable term herein are intended to specially indicate the term is first mentioned in individual sections rather than limit the term's amount.

While only certain features of the invention have been illustrated and described herein, many modifications and changes will occur to those skilled in the art. For example, channels are not necessary to keep in straight and may be in inclined shape. The channels are also not necessary to be concentric with each other. The ratio of different channels may vary to fit various ratio of solid and liquid fuels. It is, therefore, to be understood that the appended claims are intended to cover all such modifications and changes as fall within the true spirit of the invention.

What is claimed is:

1. A feeding method for a gasifier, comprising:
   conveying a liquid fuel through a first channel wherein the liquid fuel is a recycled fines slurry, a combined coal slurry and recycled fines slurry or combinations of the recycled fines slurry or the combined coal slurry and recycled fines slurry with additives for adjusting fusion point;
   conveying a solid fuel through a second channel surrounding the first channel, the second channel including a first discharge end with a mixing section wherein the solid fuel is pulverized coal, pulverized biomass, petroleum coke, oil shale, oil sand, municipal waste or any combinations thereof;
   conveying a fluid stream though a third channel surrounding the second channel;
   atomizing the liquid fuel into an atomized liquid fuel before being mixed with the solid fuel;
   mixing the solid fuel with the atomized liquid fuel to form a hybrid fuel in the mixing section of the first discharge end before gasification thereof; and
   dispersing the hybrid fuel using the fluid stream after the hybrid fuel exits the first discharge end.

2. The method of claim 1, wherein conveying a liquid fuel through a first channel comprises introducing a recycled fines slurry through the first channel.

3. The method of claim 1, wherein atomizing the liquid fuel into the atomized liquid fuel is implemented using the first channel.

4. The method of claim 1, further comprising conveying an atomization gas through a fourth channel interposed between the first channel and the second channel.

5. The method of claim 4, further comprising atomizing the liquid fuel to the atomized liquid fuel using the atomization gas.

6. An injector for a gasifier, comprising:
   a body comprising a first channel for conveying a recycled fines slurry;
   a first member substantially concentric with the body to define a second channel for pneumatically conveying a solid fuel, the first member including a first discharge end with a mixing section; and
   a second member substantially concentric with the first member to define a third channel for conveying a fluid stream,
   wherein the solid fuel is pulverized coal, pulverized biomass, petroleum coke, oil shale, oil sand, municipal waste or any combinations thereof; the recycled fines slurry is atomized before being mixed with the solid fuel; the solid fuel is mixed with the atomized recycled fines slurry in the mixing section of the first discharge end to form a hybrid fuel before gasification thereof; and the hybrid fuel is dispersed by the fluid stream after exiting the first discharge end.

7. The injector of claim 6, wherein the recycled fines slurry defines a flow direction, and wherein the first channel extends along the flow direction and is configured to produce pressure to atomize the recycled fines slurry.

8. The injector of claim 6, further comprising a third member interposed between the first member and the body, wherein the third member and the body define a fourth channel for conveying an atomization gas for atomizing the recycled fines slurry.

9. An injector for a gasifier, comprising:
   a body comprising a first channel for conveying a liquid fuel;
   a first member surrounding the body to define a second channel for pneumatically conveying a solid fuel, the first member including a first discharge end with a mixing section; and
   a second member surrounding the first member to define a third channel for conveying a fluid stream,
   wherein the liquid fuel is a recycled fines slurry, a combined coal slurry and recycled fines slurry or combinations of the recycled fines slurry or the combined coal slurry and recycled fines slurry with additives for adjusting fusion point;
   the solid fuel is pulverized coal, pulverized biomass, petroleum coke, oil shale, oil sand, municipal waste or any combinations thereof;
   the liquid fuel is atomized before being mixed with the solid fuel;
   the solid fuel is mixed with the atomized liquid fuel in the mixing section of the first discharge end to form a hybrid fuel suitable for gasification thereof; and
   the hybrid fuel is dispersed by the fluid stream after exiting the first discharge end.

10. The injector of claim 9, wherein the liquid fuel defines a flow direction, and wherein the first channel extends along the flow direction and is configured to produce pressure difference therein to atomize the liquid fuel.

11. The injector of claim 10, wherein the first channel is a circular conduit that comprises an inlet and an outlet having a smaller diameter than the inlet.

12. The injector of claim 10, wherein the second member comprises an inner surface inclining inwardly at an end thereof to form a second discharge end where the fluid stream disperses the hybrid fuel.

13. The injector of claim 9, wherein the third channel comprises a swirling mechanism configured to impart a swirling flow to the fluid stream.

14. The injector of claim 9, further comprising a third member interposed between the first member and the body, wherein the third member and the body define a fourth channel for conveying an atomization gas.

15. The injector of claim 14, further comprising more than two additional discharge ends stacking along a longitudinal axis of the injector.

16. The injector of claim 15, wherein at least one of the more than two additional discharge ends is cone-shaped.

17. The injector of claim 15, wherein the more than two additional discharge ends comprise a third discharge end where the atomization gas atomizes the liquid fuel to form the atomized liquid fuel.

18. The injector of claim 17, wherein the more than two additional discharge ends further comprises a fourth discharge end where the fluid stream disperses the hybrid fuel.

19. The injector of claim 15, wherein the fourth channel comprises a swirling mechanism configured to impart swirling flow to the fluid stream.

20. The injector of claim 14, wherein the atomization gas is an oxidizing stream.

21. The injector of claim 9, wherein the fluid stream is an oxidizing stream.

* * * * *